US012751873B2

(12) United States Patent
Xie et al.

(10) Patent No.: US 12,751,873 B2
(45) Date of Patent: Oct. 6, 2026

(54) PORTABLE FOLDABLE MEDICAL BED FRAME

(71) Applicant: ANHUI LANGWEI MEDICAL DEVICE TECHNOLOGY CO., LTD., Mingguang City (CN)

(72) Inventors: Xiaosheng Xie, Mingguang City (CN); Caihong Wei, Mingguang City (CN)

(73) Assignee: ANHUI LANGWEI MEDICAL DEVICE TECHNOLOGY CO., LTD., Mingguang City (CN)

(*) Notice: Subject to any disclaimer, the term of this patent is extended or adjusted under 35 U.S.C. 154(b) by 21 days.

(21) Appl. No.: 19/030,387

(22) Filed: Jan. 17, 2025

(65) Prior Publication Data

US 2026/0115066 A1 Apr. 30, 2026

(30) Foreign Application Priority Data

Oct. 31, 2024 (CN) ......................... 202422646036.9

(51) Int. Cl.
*A61G 7/015* (2006.01)
*A61G 7/08* (2006.01)

(52) U.S. Cl.
CPC ............... *A61G 7/015* (2013.01); *A61G 7/08* (2013.01)

(58) Field of Classification Search
CPC .......... A61G 7/015; A61G 7/08; A47C 19/12; A47C 19/122
USPC ............................................ 5/178, 613, 620
See application file for complete search history.

(56) References Cited

U.S. PATENT DOCUMENTS 323,800 A * 8/1885 Fenton ................. A47C 19/122 5/152
452,737 A * 5/1891 Tilley ................... A47C 19/128 5/178
554,098 A * 2/1896 Tilley ................... A47C 19/128 5/178
892,998 A * 7/1908 Lennox .................. A47C 17/58 5/161
972,537 A * 10/1910 Jeffcott .................. A61G 7/015 5/617
1,087,573 A * 2/1914 Dautrich .............. A47C 19/128 5/178
1,493,699 A * 5/1924 Pond .................... A47B 3/0912 5/613
1,810,516 A * 6/1931 Duvall ................... A47C 17/40 5/162
1,814,828 A * 7/1931 Chackes .............. A47C 19/122 5/162
3,456,269 A * 7/1969 Goodman ............ A47C 19/122 5/178

(Continued)

*Primary Examiner* — David R Hare

(57) ABSTRACT

Disclosed is a portable foldable medical bed frame, which includes a foot bed frame assembly and assembled components. The assembled components are arranged on an outer side of the foot bed frame assembly, the entire medical bed is formed by arranging the foot bed frame assembly and the assembled components, and the assembled components include a limiting buckle, a slot, a leg bed frame assembly, a foldable connecting piece, a back bed frame assembly and connecting rods. The limiting buckle is fixedly mounted on one side of the lower portion of the foot bed frame assembly, the slot is formed on an inner side of the limiting buckle, and the leg bed frame assembly is fixedly mounted on one side of the foot bed frame assembly.

6 Claims, 2 Drawing Sheets

(56) References Cited

U.S. PATENT DOCUMENTS

| | | | | |
|---|---|---|---|---|
| 7,493,667 | B2 * | 2/2009 | Ferko, III | A61G 7/015 297/55 |
| 8,407,837 | B1 * | 4/2013 | Huang | A61G 7/002 5/116 |
| 9,009,896 | B2 * | 4/2015 | Suh | A47C 19/122 5/618 |
| 2002/0144350 | A1 * | 10/2002 | Shih | A61G 7/005 5/616 |
| 2010/0005587 | A1 * | 1/2010 | Choi | A47C 19/122 5/202 |
| 2017/0119166 | A1 * | 5/2017 | An | A47C 17/40 |
| 2018/0255936 | A1 * | 9/2018 | Choi | A47C 19/122 |
| 2025/0134267 | A1 * | 5/2025 | Horst | A61G 7/015 |

* cited by examiner

PORTABLE FOLDABLE MEDICAL BED FRAME

CROSS REFERENCE TO RELATED APPLICATION

This application claims the priority of Chinese Patent Application No. 2024226460369, entitled "PORTABLE FOLDABLE MEDICAL BED FRAME", filed with the Chinese Patent National Intellectual Property Administration on Oct. 31, 2024, which is incorporated herein by reference in its entirety as part of the present application.

TECHNICAL FIELD

The disclosure relates to the technical field of foldable bed frames, and in particular to a portable foldable medical bed frame.

BACKGROUND

In the fields of medical treatment and nursing, medical bed frames are important devices for the rest and treatment of patients, conventional medical bed frames are mostly of fixed structures and are large in size and not easy to move and store, which poses challenges in emergencies or in environments with limited spaces (e.g. ambulances, home care, etc.). With the continuous development of medical equipment and increased requirements for convenience, a portable foldable medical bed frame has come into existence.

A conventional foldable bed frame in the prior art document with Chinese patent CN207520289U has excessive components arduous to mount and is light in weight and prone to deformation after unfolding. Although the bed frame is foldable, the folded bed frame still has a larger size, occupies a larger space or has other problems. Therefore, the disclosure provides a portable foldable medical bed frame in order to solve the problems existing in the prior art.

SUMMARY

In view of the above-mentioned problems, an object of the disclosure is to provide a portable foldable medical bed frame. The portable foldable medical bed frame includes constituent parts by redesigning and rearranging a bed structure, which are a foot bed frame assembly, a leg bed frame assembly, connecting rods, a back bed frame assembly and a head bed frame assembly; by using the back bed frame assembly and the leg bed frame assembly, the structures of components are optimized, and a space under a bed is reasonably planned, so that even though the overall size is reduced, the components do not interfere with each other.

To achieve the object of the disclosure, the disclosure is implemented by the following technical solution. A portable foldable medical bed frame includes a foot bed frame assembly and assembled components. The assembled components are arranged on an outer side of the foot bed frame assembly. The entire medical bed is formed by arranging the foot bed frame assembly and the assembled components, and the assembled components include a limiting buckle, a slot, the leg bed frame assembly, a foldable connecting piece, the back bed frame assembly and the connecting rods. The limiting buckle is fixedly mounted on one side of the lower portion of the foot bed frame assembly, the slot is formed on an inner side of the limiting buckle, the leg bed frame assembly is fixedly mounted on one side of the foot bed frame assembly, the foldable connecting piece is movably mounted on one side of the foot bed frame assembly, the foldable connecting piece is arranged at a middle position of the medical bed, and the back bed frame assembly is fixedly mounted on one side of the leg bed frame assembly. The connecting rods are fixedly mounted on an inner side of the back bed frame assembly, the connecting rods are arranged on an inner side of the medical bed, and multiple connecting rods are provided.

In some embodiments, a head bed frame assembly is fixedly mounted on one side of the foot bed frame assembly, and the head bed frame assembly is arranged on one end of the medical bed.

In some embodiments, telescopic rods are movably mounted on an inner side of the foot bed frame assembly and an inner side of the head bed frame assembly, and universal wheels are fixedly mounted at the bottoms of the telescopic rods, respectively.

In some embodiments, a movable rotary shaft is rotatably mounted on one side of each telescopic rod.

In some embodiments, a top board is fixedly mounted on one side of the foot bed frame assembly, and a limiting seat is movably mounted on one side of the top board.

In some embodiments, a pivoting shaft is movably mounted inside the leg bed frame assembly, and a handle is movably mounted on one side above the pivoting shaft.

In some embodiments, multiple back bed frame assemblies are provided, and each back bed frame assembly has the same specification and function.

The disclosure has the beneficial effects: according to the disclosure, the bed frame includes constituent parts by redesigning and rearranging the bed structure, which are the foot bed frame assembly, the leg bed frame assembly, the connecting rods, the back bed frame assembly and the head bed frame assembly; by using the back bed frame assembly and the leg bed frame assembly, the structures of the components are optimized, and the space under the bed is reasonably planned, so that even though the overall size is reduced, various components do not interfere with each other. The connection is performed by means of the foldable connecting piece, such that the bed frame can be used only by unfolding the bed frame, mounting the bed frame on a head bed frame and a foot bed frame and mounting the connecting rods. In addition, a bed surface has a slope by inclining the head bed frame and the foot bed frame, so that the bed frame has a better bearing effect, occupies a smaller space and is also more convenient to pack.

BRIEF DESCRIPTION OF THE DRAWINGS

To illustrate the technical solutions in the embodiments of the disclosure or the prior art more clearly, the accompanying drawings required for the embodiments will be briefly described below. Apparently, the accompanying drawings in the following description show merely some embodiments of the disclosure, and those of ordinary skill in the art may still derive other accompanying drawings from these accompanying drawings without creative efforts.

In the figures: 1. foot bed frame assembly; 2. limiting buckle; 3. slot; 4. leg bed frame assembly; 5. foldable connecting piece; 6. back bed frame assembly; 7. connecting rod; 8. head bed frame assembly; 9. telescopic rod; 10.

universal wheel; 11. movable rotary shaft; 12. top board; 13. limiting seat; 14. pivoting shaft; 15. handle.

DETAILED DESCRIPTION OF THE EMBODIMENTS

The technical solutions of embodiments will be clearly and completely described below with reference to the accompanying drawings in the embodiments of the disclosure. Apparently, the embodiments described are merely some rather than all of the embodiments of the present disclosure. On the basis of the embodiments of the disclosure, all other embodiments obtained by a person of ordinary skill in the art on the premise of no creative work shall fall within the scope of protection of the disclosure.

In this description of the disclosure, it should be noted that unless otherwise explicitly specified and defined, the terms "mounting", "connecting" and "attaching" should be understood in a broad sense, for example, they may be a fixed connection, a detachable connection, or an integrated connection, may be a mechanical connection or an electrical connection, may be a direct connection, an indirect connection by means of an intermediary, or an internal communication between two elements. For those of ordinary skill in the art, the specific meanings of the terms mentioned above in the disclosure should be construed according to specific circumstances.

Figure 1:
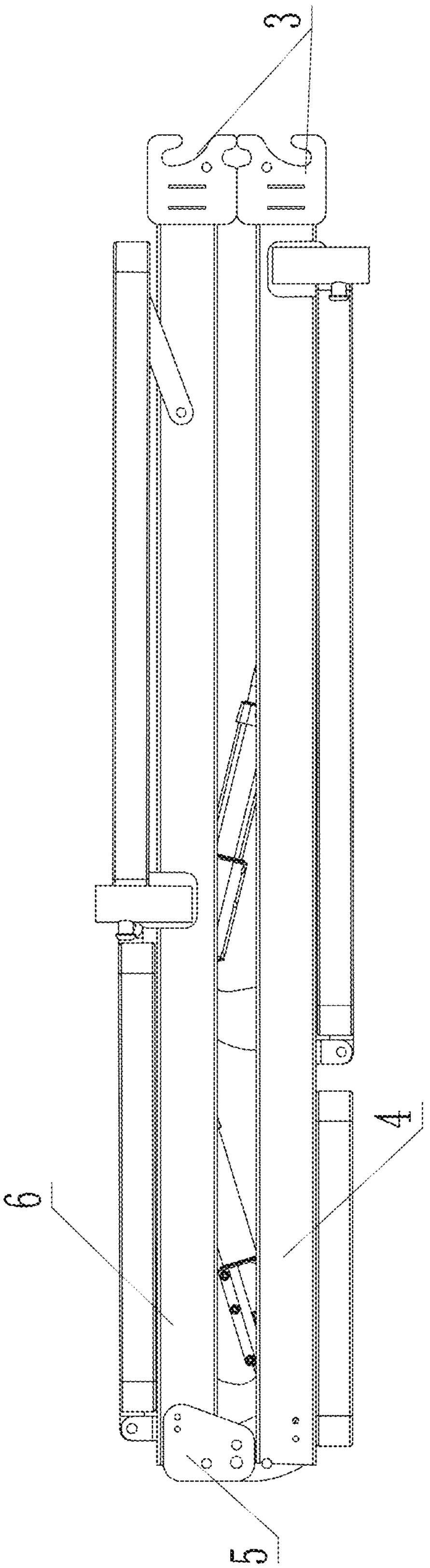
FIG. 1 is a view of a folded product of the disclosure.
Figure 2:
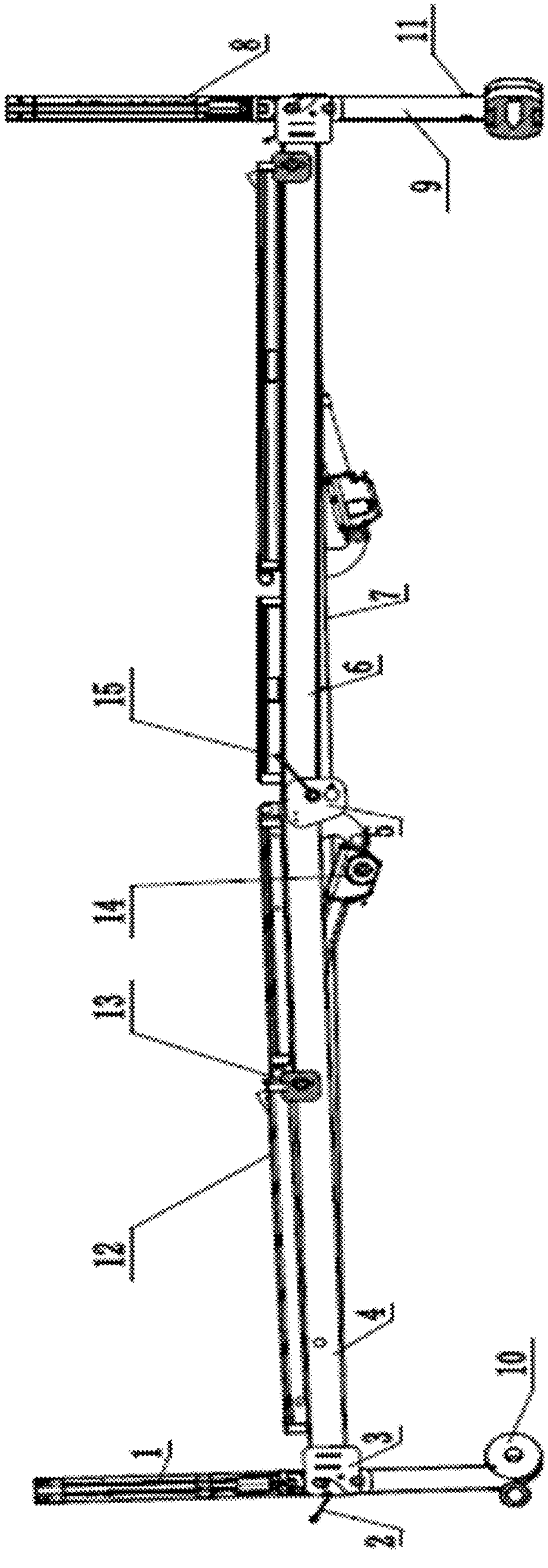
FIG. 2 is a side view of the product of the disclosure.

As shown in FIGS. 1 and 2, this embodiment provides a portable foldable medical bed frame, which includes a foot bed frame assembly 1 and assembled components. The assembled components are arranged on an outer side of the foot bed frame assembly 1, the entire medical bed is formed by arranging the foot bed frame assembly 1 and the assembled components, and the assembled components include a limiting buckle 2, a slot 3, a leg bed frame assembly 4, a foldable connecting piece 5, a back bed frame assembly 6 and multiple connecting rods 7. The limiting buckle 2 is fixedly mounted on one side of the lower portion of the foot bed frame assembly 1, and different parts of a foldable bed are locked by arranging multiple limiting buckles 2 to prevent accidental folding or movement during use. When the bed is unfolded for use, the limiting buckles fixe various components of the bed to keep various components in a stable state, the slot 3 is formed on an inner side of each limiting buckle 2, and a fixed insertion point is provided for the limiting buckle by arranging the slot 3. When the foldable bed is unfolded for use, the limiting buckles 2 is pushed into the slots 3 to lock various components of the bed. The leg bed frame assembly 4 is fixedly mounted on one side of the foot bed frame assembly 1, and the medical bed is stably supported and fixed by the leg bed frame assembly 4 in a support position. The foldable connecting piece 5 is movably mounted on one side of the foot bed frame assembly 1, the foldable connecting piece 5 is arranged at a middle position of the medical bed, and the bed can be easily unfolded and folded by means of the foldable connecting piece 5. Also, the foldable connecting piece 5 is generally made of a metal or plastic, which has an elasticity and a strength and is repeatedly bendable without damage. The back bed frame assembly 6 is fixedly mounted on one side of the leg bed frame assembly 4, and the back bed frame assembly 6 allows a back bed frame to go up and down within a range of angle, such that a patient can adjust the position of a back according to his/her own needs. Multiple connecting rods 7 are fixedly mounted on an inner side of the back bed frame assembly 6, and are arranged on an inner side of the medical bed. The medical bed is conveniently connected and mounted for use by arranging the connecting rods 7.

A head bed frame assembly 8 is fixedly mounted on one side of the foot bed frame assembly 1, and the head bed frame assembly 8 is arranged on one end of the medical bed.

Multiple telescopic rods 9 are movably mounted on an inner side of the foot bed frame assembly 1 and on an inner side of the head bed frame assembly 8, it is convenient to adjust the height of the entire foldable bed for use by arranging the telescopic rods 9. Multiple universal wheels 10 are fixedly mounted at the bottoms of the telescopic rods 9, and it is convenient to flexibly move the foldable bed by arranging the universal wheels 10.

A movable rotary shaft 11 is rotatably mounted on one side of each telescopic rod 9, and the telescopic rod 9 is stably fixed for use by rotating the movable rotary shaft 11.

A top board 12 is fixedly mounted on one side of the foot bed frame assembly 1, the top of the medical bed is fixedly mounted for use by arranging the top board 12. A limiting seat 13 is movably mounted on one side of the top board 12, and a mounting position of the top board 12 is limited by arranging the limiting seat 13.

A pivoting shaft 14 is movably mounted inside the leg bed frame assembly 4, it is convenient to fold an entire bed body for use by arranging the pivoting shaft 14, a handle 15 is movably mounted on one side above the pivoting shaft 14, and it is convenient to turn and fold the foldable connecting piece 5 for use by arranging the handle 15.

Multiple back bed frame assemblies 6 are provided, each back bed frame assembly 6 has the same specification and function, and the bottom of the entire medical bed is stably supported for use by arranging the back bed frame assemblies 6.

When the portable foldable medical bed frame is used, the connecting rods 7 at the bottom of the bed are first removed, the limiting buckle 2 on the leg bed frame assembly 4 is then opened to raise a bed surface, the slot 3 is removed from the foot bed frame assembly 1, and the above operations are repeated to remove the back frame assemblies 6 from the head bed frame assembly 8; later, the limiting buckle 3 on the foldable connecting piece 5 is removed, and the leg bed frame assembly 4 and the back bed frame assembly 6 are folded in half; the entire medical bed is formed by arranging the foot bed frame assembly 1 and the assembled components, and the different parts of the foldable bed are locked by arranging the limiting buckles 2 to prevent accidental folding or movement during use. When the bed is unfolded for use, the buckles fixe various components of the bed to keep various components in a stable state, and fixed insertion points are provided for the buckles by arranging the slots 3. When the foldable bed is unfolded for use, the limiting buckles 2 are pushed into the slots 3 to lock various components of the bed, the medical bed is stably supported and fixed by the leg bed frame assembly 4 in a support position, and the bed can be easily unfolded and folded by means of the foldable connecting piece 5. Also, the foldable connecting piece 5 is generally made of the metal or plastic, which has an elasticity and a strength and is repeatedly bendable without damage. The back bed frame assembly 6 allows the back bed frame to go up and down within a range of angle, such that the patient can adjust the position of the back according to his/her own needs. The medical bed is connected and mounted for use by arranging the connecting rods 7. It is convenient to adjust the height of the entire foldable bed for use by arranging the telescopic rods 9. It is convenient to flexibly move the foldable bed by arranging the universal wheels 10; and each telescopic rod 9 is stably fixed for use by rotating the movable rotary shaft 11. The top of the medical bed is fixedly mounted for use by arranging the top board 12, and the mounting position of the top board 12 is limited by arranging the limiting seat 13. It is convenient to fold an entire bed body for use by arranging the pivoting shaft 14. It is convenient to turn and fold the foldable connecting piece 5 for use by arranging the handle 15. It is convenient to fold the entire bed body for use by arranging the pivoting shaft 14. It is convenient to turn and fold the foldable connecting piece 5 for use by arranging the handle 15, and the bottom of the entire medical bed is stably supported for use by arranging the back bed frame assemblies 6.

The above description illustrates the basic principle, main features and advantages of the disclosure. Those of ordinary skill in the art should understand that the disclosure is not limited by the above-described embodiments. The above-described embodiments and the specification only describe the principle of the disclosure. Various changes and improvements of the disclosure can further be made without departing from the spirit and scope of the disclosure, and these changes and improvements shall fall within the claimed scope of protection of the disclosure. The claimed scope of protection of the disclosure is defined by the append claims and their equivalents.

What is claimed is:

1. A portable foldable medical bed frame, comprising a foot bed frame assembly and assembled components, wherein the assembled components are arranged on an outer side of the foot bed frame assembly, the assembled components comprise a limiting buckle, a slot, a leg bed frame assembly, a foldable connecting piece, a back bed frame assembly and a plurality of connecting rods; the limiting buckle is fixedly mounted on one side of a lower portion of the foot bed frame assembly, the slot is formed on an inner side of the limiting buckle, the leg bed frame assembly is fixedly mounted on one side of the foot bed frame assembly, the foldable connecting piece is movably mounted on one side of the foot bed frame assembly, and the back bed frame assembly is fixedly mounted on one side of the leg bed frame assembly; the connecting rods are fixedly mounted on an inner side of the back bed frame assembly, and the connecting rods are arranged on an inner side of the medical bed;

wherein the foldable connecting piece has one end connected to the leg bed frame assembly and another end connected to the back bed frame assembly; and wherein the foldable connecting piece is made of plastic, which has an elasticity and a strength; and wherein a pivoting shaft is movably mounted inside the leg bed frame assembly, and a handle is movably mounted on one side above the pivoting shaft, and configured to turn and fold the foldable connecting piece.

2. The portable foldable medical bed frame according to claim 1, wherein a head bed frame assembly is fixedly mounted on one end of the back bed frame assembly, the foot bed frame assembly is arranged on one end of the leg bed frame assembly.

3. The portable foldable medical bed frame according to claim 1, wherein a plurality of telescopic rods are movably mounted on an inner side of the foot bed frame assembly and an inner side of a head bed frame assembly, and a plurality of universal wheels are fixedly mounted at the bottoms of the telescopic rods, respectively.

4. The portable foldable medical bed frame according to claim 3, wherein a movable rotary shaft is rotatably mounted on one side of each telescopic rod.

5. The portable foldable medical bed frame according to claim 1, wherein a top board is fixedly mounted on one side of the foot bed frame assembly, and a limiting seat is movably mounted on one side of the top board.

6. The portable foldable medical bed frame according to claim 1, wherein the back bed frame assembly comprises a plurality of back bed frame assemblies, and each of the back bed frame assemblies has the same specification and function.

* * * * *